(12) United States Patent  (10) Patent No.: US 11,262,615 B2
Sun  (45) Date of Patent: Mar. 1, 2022

(54) SIDE-INCIDENCE BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventor: Yanjun Sun, Beijing (CN)

(73) Assignees: BEIJING BOE DISPLAY TECHNOLOGY CO., LTD., Beijing (CN); BOE TECHNOLOGY GROUP CO.. LTD., Beijing (CN)

( * ) Notice: Subject to any disclaimer, the term of this patent is extended or adjusted under 35 U.S.C. 154(b) by 479 days.

(21) Appl. No.: 16/328,880

(22) PCT Filed: Aug. 7, 2018

(86) PCT No.: PCT/CN2018/099182
§ 371 (c)(1),
(2) Date: Feb. 27, 2019

(87) PCT Pub. No.: WO2019/076101
PCT Pub. Date: Apr. 25, 2019

(65) Prior Publication Data
US 2021/0333631 A1  Oct. 28, 2021

(30) Foreign Application Priority Data
Oct. 19, 2017 (CN) .......................... 201710976977.0

(51) Int. Cl.
*G02B 6/00* (2006.01)
*G02F 1/13357* (2006.01)
*F21V 8/00* (2006.01)

(52) U.S. Cl.
CPC ..... *G02F 1/133603* (2013.01); *G02B 6/0031* (2013.01); *G02B 6/0055* (2013.01); *G02F 1/133605* (2013.01); *G02B 6/0046* (2013.01)

(58) Field of Classification Search
CPC .. G02B 6/0013; G02B 6/0023; G02B 6/0025; G02B 6/0031; G02B 6/0051;
(Continued)

(56) References Cited

U.S. PATENT DOCUMENTS

2003/0103179 A1  6/2003 Hayata et al.
2005/0072032 A1* 4/2005 McCollum ........... G02B 6/0021
362/812

(Continued)

FOREIGN PATENT DOCUMENTS

CN  202196197 U  4/2012
CN  103672602 A  3/2014
(Continued)

OTHER PUBLICATIONS

Search Report and Written Opinion for International Application No. PCT/CN2018/099182 dated Nov. 14, 2018.
(Continued)

*Primary Examiner* — Y M. Quach Lee
(74) *Attorney, Agent, or Firm* — Calfee, Halter & Griswold LLP

(57) ABSTRACT

A side-incidence backlight module including a light guide plate, a light strip and a light leakage preventing member. The light strip is disposed at a side of a light incident surface of the light guide plate and includes at least one light emitting element. The light leakage preventing member is located between the light strip and the light guide plate and extends along a width direction of the light guide plate. The light leakage preventing member includes at least one groove. An opening of the groove faces the light strip. The
(Continued)

at least one light emitting element is at least partially accommodated in the groove.

18 Claims, 5 Drawing Sheets

(58) Field of Classification Search
CPC .. G02B 6/0053; G02B 6/0055; G02B 6/0045; G02B 6/0046; G02F 1/133605
See application file for complete search history.

(56) References Cited

U.S. PATENT DOCUMENTS

| | | | | |
|---|---|---|---|---|
| 2006/0007704 | A1* | 1/2006 | Mori | G02B 6/0013 362/613 |
| 2009/0262517 | A1* | 10/2009 | Suehiro | G02B 6/0023 362/84 |
| 2009/0296017 | A1* | 12/2009 | Itoh | G02B 6/0023 362/249.14 |
| 2014/0133178 | A1* | 5/2014 | Kwon | G02B 6/0023 362/609 |
| 2014/0176869 | A1 | 6/2014 | Lee et al. | |
| 2014/0307467 | A1 | 10/2014 | Jia et al. | |

FOREIGN PATENT DOCUMENTS

| | | |
|---|---|---|
| CN | 203982042 U | 12/2014 |
| CN | 107153285 A | 9/2017 |
| CN | 107526217 A | 12/2017 |

OTHER PUBLICATIONS

First Office Action for Chinese Patent Application No. 201710976977.0 dated Apr. 12, 2019.

* cited by examiner

SIDE-INCIDENCE BACKLIGHT MODULE AND DISPLAY DEVICE

CROSS REFERENCE TO RELATED APPLICATIONS

The present application is a 35 U.S.C. 371 national stage application of PCT International Application No. PCT/CN2018/099182, filed on Aug. 7, 2018, which claims the benefit of a Chinese patent application No. 201710976977.0, filed on Oct. 19, 2017, the contents of which are incorporated herein by reference in their entireties.

TECHNICAL FIELD

The present disclosure relates to a technical field of displays, in particular to a side-incidence backlight module and a display device.

BACKGROUND

A backlight module is an important component of a liquid crystal display. Backlight modules are used to provide sufficient and uniform planar backlight for a liquid crystal display. The common backlight module mainly includes a plastic frame, a back plate, a light source, a light guide plate, optical films and the like. The back plate, the light source, the light guide plate and the optical films are positioned in the plastic frame. The backlight modules are usually classified into side-incidence backlight modules and bottom-incidence backlight modules, wherein the side-incidence backlight module generally uses a light strip located at a side of the plastic frame as a light source. A light emitting surface of the light source faces a light incident surface of the light guide plate, and the light emitted by the light source enters into the light guide plate and is reflected to irradiate a liquid crystal panel. However, some of the light emitted by the light source fails to enter the light guide plate, i.e. there is light leakage, resulting in decrease in light efficiency.

SUMMARY

According to a first aspect of an exemplary embodiment, there is provided a side-incidence backlight module, the side-incidence backlight module comprising:

a light guide plate;

a light strip disposed at a side of a light incident surface of the light guide plate and including at least one light emitting element; and a light leakage preventing member located between the light strip and the light guide plate and extending along a width direction of the light guide plate, wherein the light leakage preventing member includes at least one groove, an opening of the groove faces the light strip, and the at least one light emitting element is at least partially accommodated in the groove.

Optionally, the side-incidence backlight module further includes a back plate, and the light guide plate and the light leakage preventing member are arranged on the back plate.

Optionally, the light strip further includes a printed circuit board on which the at least one light emitting element is disposed.

In some exemplary embodiments, the number of the grooves is 1. The groove runs through the light leakage preventing member along the width direction of the light guide plate.

In some exemplary embodiments, there are a plurality of light emitting elements, a number of grooves is the same as a number of the light emitting elements, and the light emitting elements correspond to the grooves one by one.

In some exemplary embodiments, the upper surface and/or the lower surface of the light leakage preventing member are provided with dots.

In some exemplary embodiments, a thickness of the light leakage preventing member is the same as that of the light guide plate, the upper surface of the light leakage preventing member is flush with the upper surface of the light guide plate, and the lower surface of the light leakage preventing member is flush with the lower surface of the light guide plate; a length of the light leakage preventing member is the same as a width of the light guide plate.

In some exemplary embodiments, the above-mentioned side-incidence backlight module may include two reflective films, one of which is attached to the upper surface of the light leakage preventing member and part of the upper surface of the light guide plate at the light leakage preventing member side, and the other of which is attached to the lower surface of the light leakage preventing member and the lower surface of the light guide plate.

Optionally, the above-mentioned side-incidence backlight module may include three reflective films, one of which is attached to the upper surface of the light leakage preventing member and part of the upper surface of the light guide plate at the light leakage preventing member side, one of which is attached to the lower surface of the light leakage preventing member, and the other of which is attached to the lower surface of the light guide plate.

In some exemplary embodiments, at one side of the light strip, the sides of the two reflective films are flush with the sides of the light leakage preventing member.

In some exemplary embodiments, the material of the light leakage preventing member may be the same as that of the light guide plate.

In some exemplary embodiments, the light incident surface of the light guide plate is an oblique surface, and the distance between the light incident surface and the light leakage preventing member gradually increases in the direction from the upper surface of the light guide plate to the bottom surface of the light guide plate.

Optionally, the inner surface of the groove is a smooth curved surface.

Alternatively, the curved surface is part of a circumferential surface or part of an elliptical surface.

In some exemplary embodiments, a gap may exist between the light leakage preventing member and the light incident surface of the light guide plate.

According to a second aspect of the exemplary embodiment, there is provided a display device including the above-mentioned side-incidence backlight module.

It should be understood that the above general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with this disclosure and together with the description serve to explain the principles of this disclosure.

DETAILED DESCRIPTION

Exemplary embodiments will be described in detail herein, examples of which are shown in the accompanying drawings. When the following description refers to the drawings, unless otherwise indicated, the same reference numbers in different drawings indicate the same or similar elements. The embodiments described in the following exemplary embodiments do not represent all embodiments consistent with this disclosure. On the contrary, they are merely examples of devices and methods consistent with some aspects of the present disclosure as detailed in the appended claims.

Figure 1:
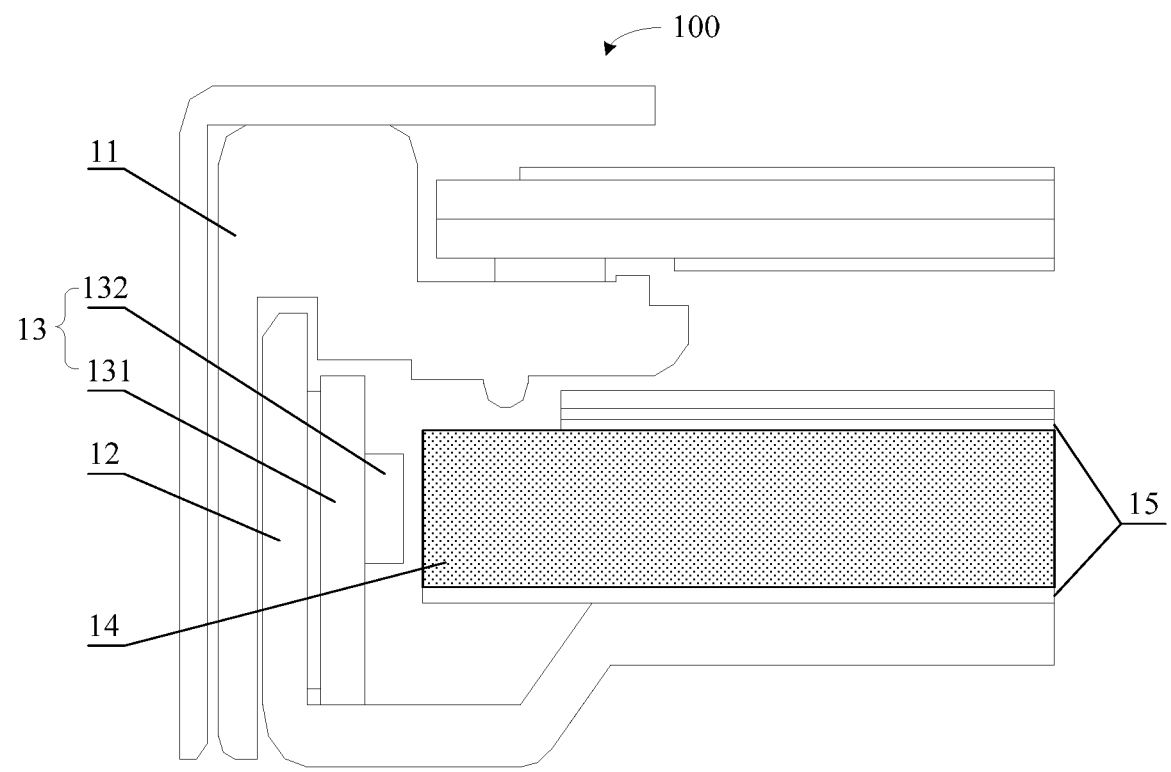
FIG. 1 is a schematic structural view of a side-incidence backlight module according to the related art.

Referring to FIG. 1, in the related art, the side-incidence backlight module 100 includes a plastic frame 11, a back plate 12, an LED light strip 13, a light guide plate 14, and an optical film 15. The LED light strip 13 is affixed to the back plate 12 with heat conductive adhesive. The LED light strip 13 includes a printed circuit board 131 and LED lamp(s) 132 disposed on the printed circuit board 131. The light emitting surface of the LED lamp 132 faces the light incident surface of the light guide plate 14, and the light emitted by the LED lamp 132 is transmitted and reflected through the light guide plate 14 and irradiated onto a liquid crystal panel.

Figure 2:
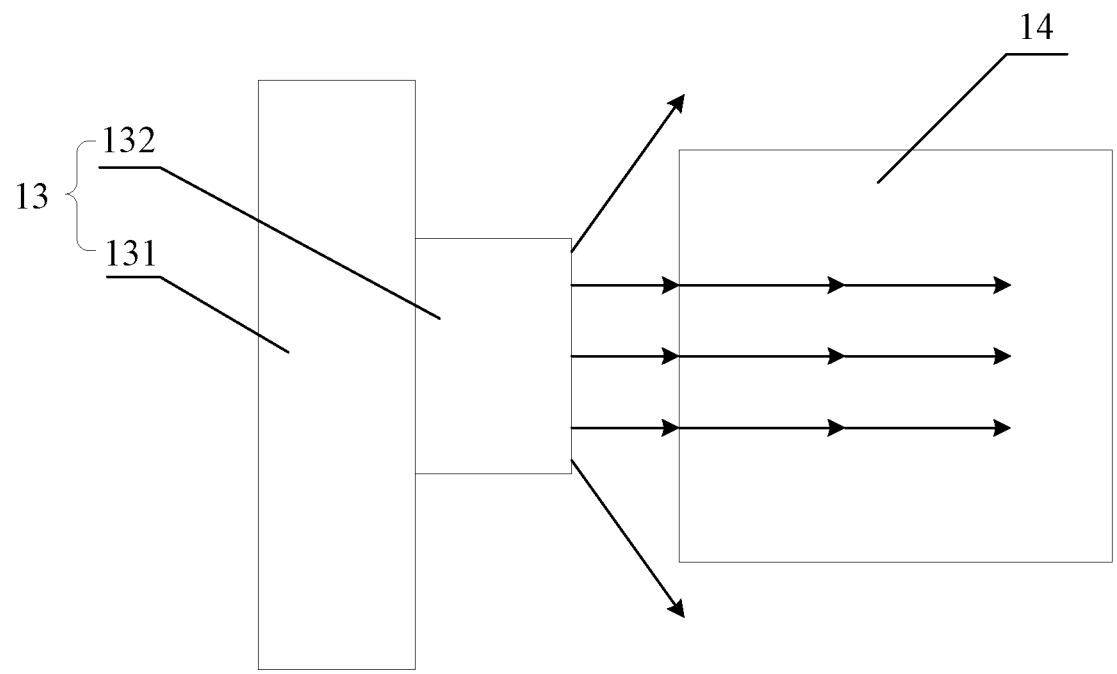
FIG. 2 is a schematic view of a light propagation path in the side-incidence backlight module shown in FIG. 1.

However, referring to FIG. 2, some of the light emitted from the LED lamp 132 fails to enter the light guide plate 14, resulting in light leakage and decreased light efficiency.

Therefore, the present disclosure provides a side-incidence backlight module and a display device, which can solve the technical problems existing in related art.

Figure 3A:
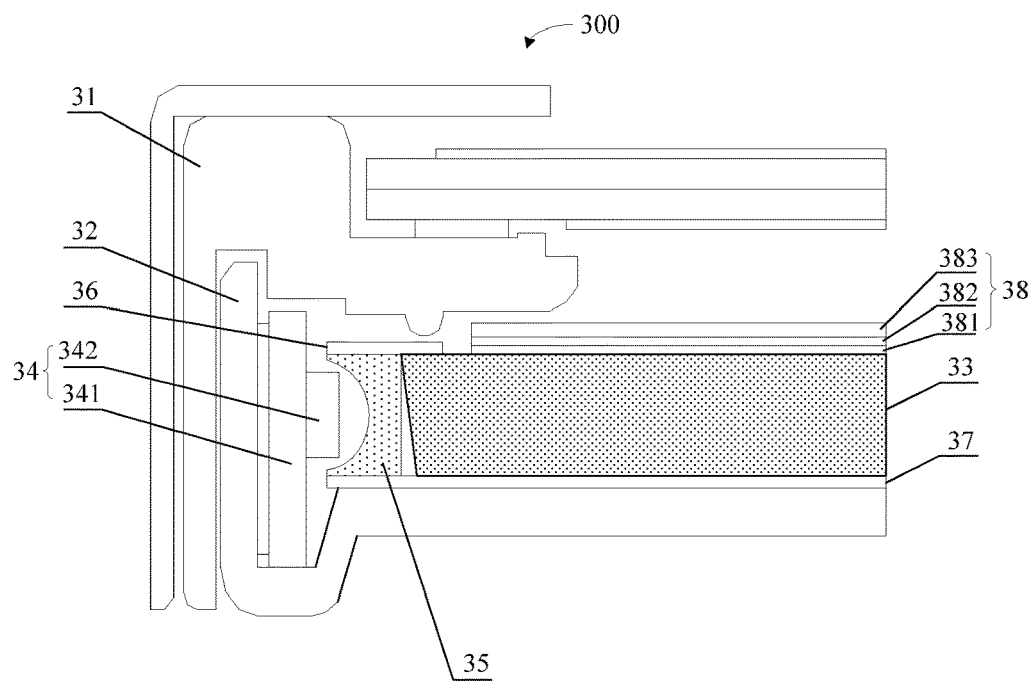
FIG. 3A is a schematic structural view of a side-incidence backlight module according to an embodiment of the present disclosure.

Referring to FIG. 3A, a side-incidence backlight module 300 according to an exemplary embodiment includes a plastic frame 31, a back plate 32, a light guide plate 33, a light strip 34, and a light leakage preventing member 35.

The light guide plate 33 and the light leakage preventing member 35 are disposed on the back plate 32. The back plate 32 has a substantially "L" shape: one surface thereof (i.e., a substantially horizontal surface in FIG. 3A) is used to carry the light guide plate 33 and the light leakage preventing member 35; the other surface (i.e., the substantially vertical surface in FIG. 3A) is used to fix the light strip 34. The light strip 34 includes a printed circuit board 341. At least one light emitting element 342 is provided on the printed circuit board 341. There may be a plurality of light emitting elements on the light strip 34. The plurality of light emitting elements 342 may be LED lamps or other light sources meeting specific requirements. The light leakage preventing member 35 is disposed on the back plate 32, and is located between the light strip 34 and the light guide plate 33 and extends in a width direction of the light guide plate 33. The light leakage preventing member 35 includes a groove, the opening of which faces the light strip 34, and the at least one light emitting element 342 is at least partially received in the groove. That is, the at least one light emitting element 342 may be partially accommodated in the groove or may be entirely accommodated in the groove. For example, the inner surface of the groove is a smooth curved surface. The curved surface is, for example, part of a circumferential surface or part of an elliptical surface. The material of the light leakage preventing member 35 may be the same as that of the light guide plate 33. The material of the light leakage preventing member 35 may be, for example, PMMA (polymethyl methacrylate) material, PC (polycarbonate) material, or MS (silane-terminated polyether prepolymer) material.

Figure 3B:
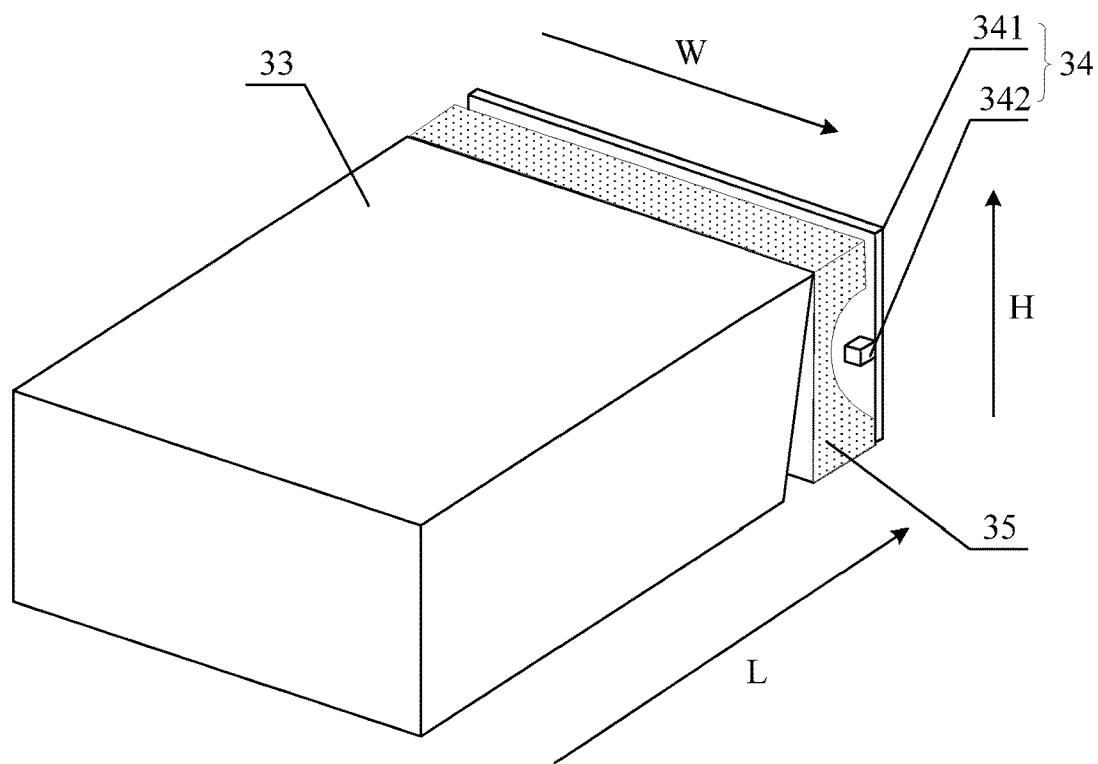
FIG. 3B is a schematic orientation view of a side-incidence backlight module according to an embodiment of the present disclosure.

It should be noted that referring to FIG. 3B, in the illustrated exemplary embodiment, the width direction W of the light guide plate 33, a length direction L of the light guide plate 33, and a thickness direction H of the light guide plate 33 are shown in FIG. 3B. In this text, the directional word "up" refers to the direction indicated by the arrow for marking the direction H in which a thickness of the light guide plate 33 is located, and the directional word "down" refers to the opposite direction to the direction indicated by the directional word "up". In order to facilitate the explanation of the relative positional relationship between various components in the exemplary embodiment, directional words such as length direction, width direction, up and down are used.

However, the directional terms used to describe the relative positional relationship between various components in the embodiments of the present disclosure are not limited to the directional terms used herein, and other directional terms may be used to describe the relative positional relationship between various components in the embodiments of the present disclosure. As long as the relative positional relationship between the various components in the embodiment of the present disclosure is unchanged, even if any orientational conversion is performed on the side-incidence backlight module as a whole, it is within the coverage range of the exemplary embodiment.

Figure 4:
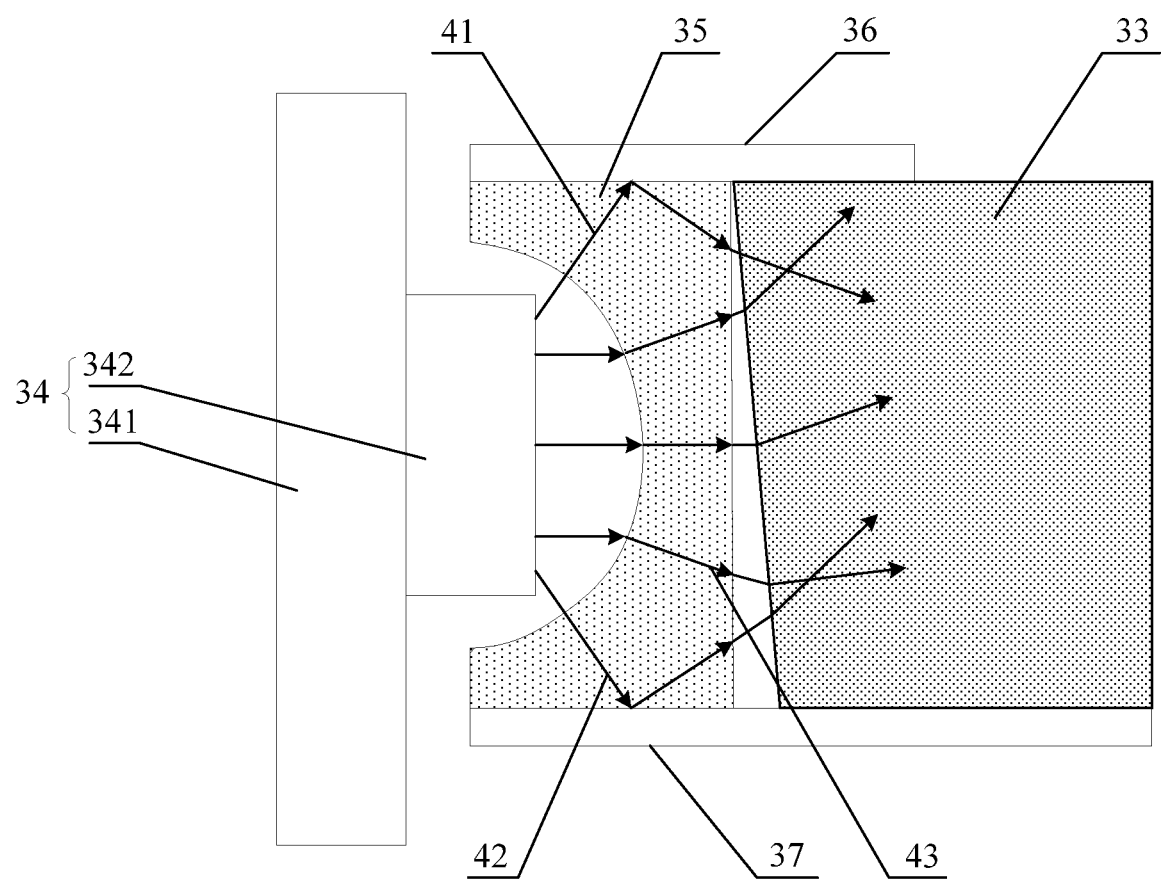
FIG. 4 is a schematic view of a light propagation path in the side-incidence backlight module shown in FIG. 3A.

Referring to FIG. 4, if the light leakage preventing member 35 does not exist in the side-incidence backlight module 300, the light rays 41 and 42 in FIG. 4 will not enter the light guide plate 33. However, in the exemplary embodiment, due to the existence of the light leakage preventing member 35, the propagation paths of the light rays 41 and 42 can be changed, and finally the light rays 41 and 42 can enter the light guide plate 33, thereby reducing light leakage and improving light efficiency.

The backlight module according to some exemplary embodiments has the technical effect that by arranging the light leakage preventing member including a groove between the light strip and the light guide plate and accommodating at least part of the light emitting element in the groove, the light leakage preventing member can increase the proportion of light emitted by the light emitting element entering the light guide plate by changing the propagation direction of light, thereby reducing light leakage and improving light efficiency.

In an exemplary embodiment, a thickness of the light leakage preventing member 35 is the same as that of the light guide plate 33, the upper surface of the light leakage preventing member 35 is flush with the upper surface of the light guide plate 33, and the lower surface of the light leakage preventing member 35 is flush with the lower surface of the light guide plate 33; a length of the light leakage preventing member 35 is the same as the width of the light guide plate 33. In this way, it is convenient to cover the surfaces of the light leakage preventing member 35 and the light guide plate 33 with the optical films.

It should be noted that in some exemplary embodiments, the light leakage preventing member 35 may be disposed in contact with the printed circuit board 341. In other embodiments, a gap may be reserved between the light leakage preventing member 35 and the printed circuit board 341 to facilitate assembling the light leakage preventing member 35 between the light strip 34 and the light guide plate 33.

Figure 5:
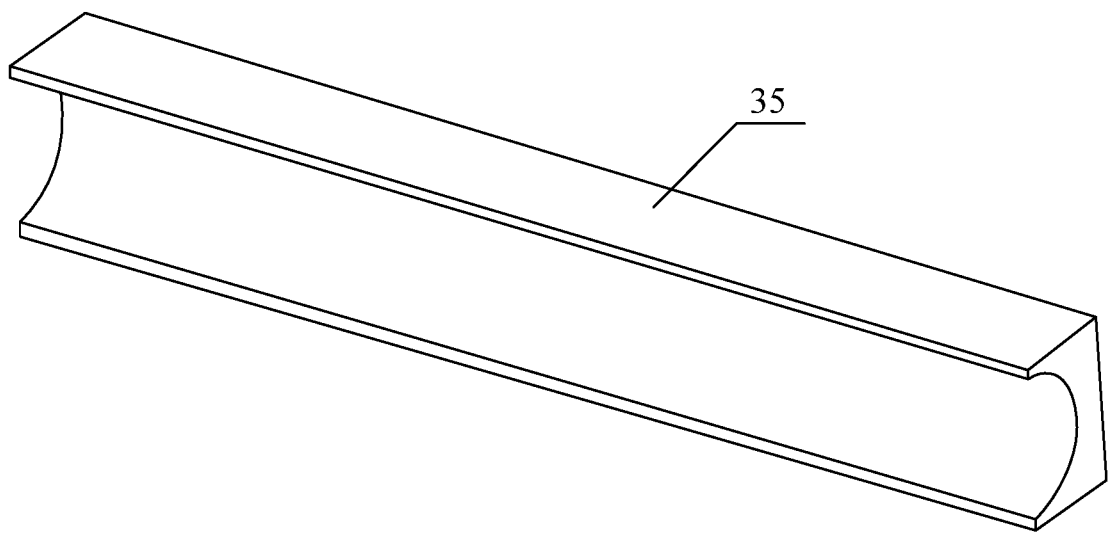
FIG. 5 is a schematic structural view of a light leakage preventing member according to an embodiment of the present disclosure.

Optionally, referring to FIG. 5, a number of the groove on the light leakage preventing member 35 is 1, and the groove runs through the light leakage preventing member 35 along the width direction of the light guide plate 33. Accordingly, each light emitting element 342 on the light strip 34 is at least partially received in the groove. The light leakage preventing member 35 adopting the structure is simple to prepare, saves materials, and can be conveniently installed.

Figure 6:
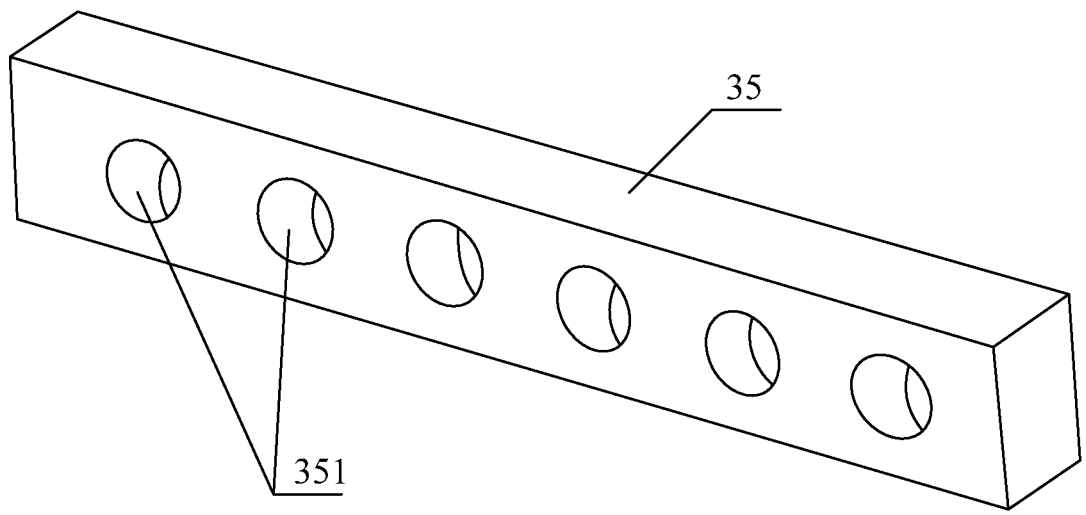
FIG. 6 is a schematic structural view of another light leakage preventing member according to an embodiment of the present disclosure.

Optionally, referring to FIG. 6, the light leakage preventing member 35 may include a plurality of grooves 351. In an exemplary embodiment the number of grooves 351 is the same as a number of the light emitting elements 342, and the light emitting elements 342 correspond to the grooves one by one. That is, one light emitting element 342 is correspondingly accommodated in one groove 351. Since each light emitting element 342 corresponds to a groove 351, the inner surface of the groove 351 can more fully surround the corresponding light emitting element 342, thereby further reducing light leakage and improving light efficiency.

Optionally, please continue to refer to FIG. 3A. The side-incidence backlight module 300 further includes reflective films 36 and 37. The reflective film 36 is attached to the upper surface of the light leakage preventing member 35 and a part of the upper surface of the light guide plate 33 at the light leakage preventing member 35 side, and the reflective film 37 is attached to the lower surface of the light leakage preventing member 35 and the lower surface (the entire lower surface) of the light guide plate 33. The reflective films 36 and 37 can reflect the light scattered from the upper and lower surfaces of the light guide plate 33 and the light leakage preventing member 35 back into the light guide plate 33 and the light leakage preventing member 35 to improve the light efficiency of the light emitted from the upper surface.

Optionally, please continue to refer to FIG. 3A. At one side of the light strip 34, the sides of the reflective films 36, 37 are flush with the side of the light leakage preventing member 35. In this way, the reflective films 36 and 37 can be conveniently attached to ensure the attaching accuracy.

Figure 7:
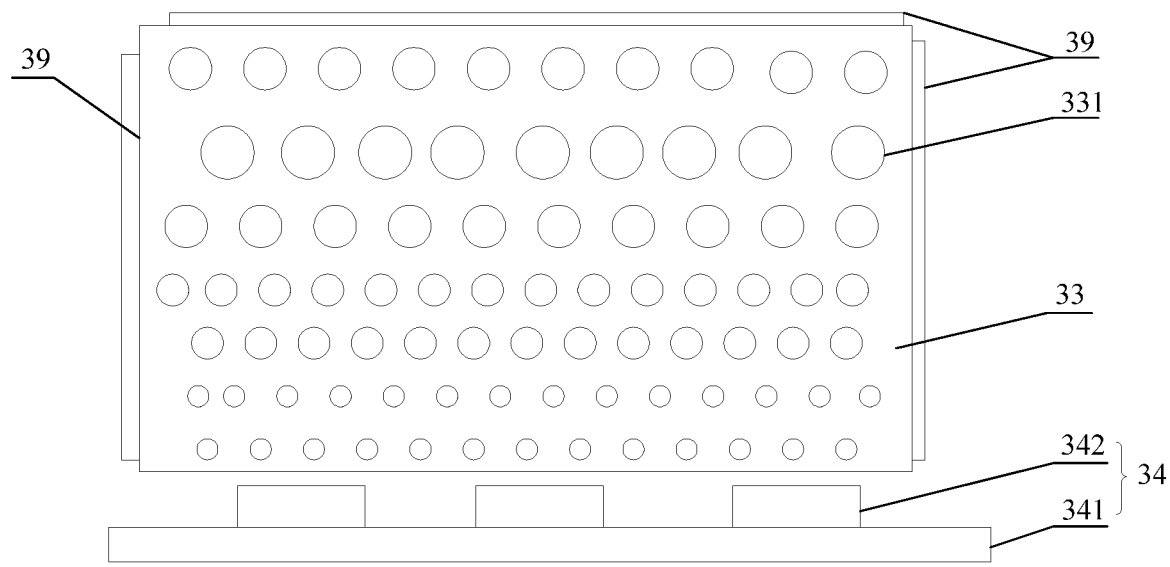
FIG. 7 is a schematic view of dot distribution on the surface of a light guide plate according to an embodiment of the present disclosure.

In an exemplary embodiment as shown in FIG. 7, the side-incidence backlight module 300 further includes three reflective films 39 respectively attached to the three sides of the light guide plate 33. The reflective film 39 can reflect the light scattered from the side of the light guide plate 33 back into the light guide plate 33 to improve the light efficiency.

Continuing to refer to FIG. 3A, the side-incidence backlight module 300 further includes an optical module 38, which is located on the upper surface of the light guide plate 33 and on the side away from the light leakage preventing member 35. The number of film layers and the material of the films in the optical module 38 can be set according to actual requirements to improve the light efficiency in a targeted manner.

In some exemplary embodiments, the optical module 38 may include a first diffusion film 381 adhered to the light exit surface of the light guide plate 33, a second diffusion film 382 adhered to the light exit surface of the first diffusion film 381, and a first prism layer 383 adhered to the light exit surface of the second diffusion film 382. The first diffusion film 381 and the second diffusion film 382 can make the distribution of outgoing light more uniform, and the first prism layer 383 can converge the received light, so that the light incident on the liquid crystal panel is uniform and has high brightness, and the light efficiency is improved.

As a variation, in other exemplary embodiments, the second diffusion film 382 and the first prism layer 383 in the above-mentioned optical module 38 may be removed and replaced by a second prism layer (instead of the second diffusion film 382) and a brightness enhancement film (instead of the first prism layer 383) adhered to the light exit surface of the second prism layer, respectively. Wherein, the brightness enhancement film can be DBEF (dual brightness enhancement film) or other films that meet specific requirements. At this time, the first diffusion film 381 can make the distribution of the emitted light more uniform, the second prism layer can converge the received light, and the brightness enhancement film can allow the received light in a specific direction to pass through and prohibit the light in other directions to pass through, so that the optical module 38 can improve the brightness of the emitted light as a whole. In this way, the optical module 38 can make the light incident on the liquid crystal panel uniform and high in brightness and improve the light efficiency.

Optionally, referring to FIG. 7, the lower surface of the light guide plate 33 may have dots 331. The closer to the light emitting element 342, the smaller the dots 331, and the farther from the light emitting element 342, the larger the dots 331. On the other hand, because the reflective film 39 is provided at the position farthest from the light emitting element 342, the dots 331 there are slightly smaller. This arrangement can ensure uniform and consistent display brightness of the liquid crystal panel. In practical application, the dots 331 can be prepared on the lower surface of the light guide plate 33 by processes such as hot pressing, printing, injection molding, etc. If dots 331 are prepared by printing process, the material of the dots 331 is almost milky white ink. If dots 331 are prepared by hot pressing or injection molding, the dots 331 are small pits. In this way, the specular reflection of the light on the lower surface of the light guide plate 33 can be destroyed, so that the light forms diffuse reflection on the lower surface, so that the light exits from the upper surface (light exit surface) of the light guide plate 33 to form a surface light source.

Figure 8:
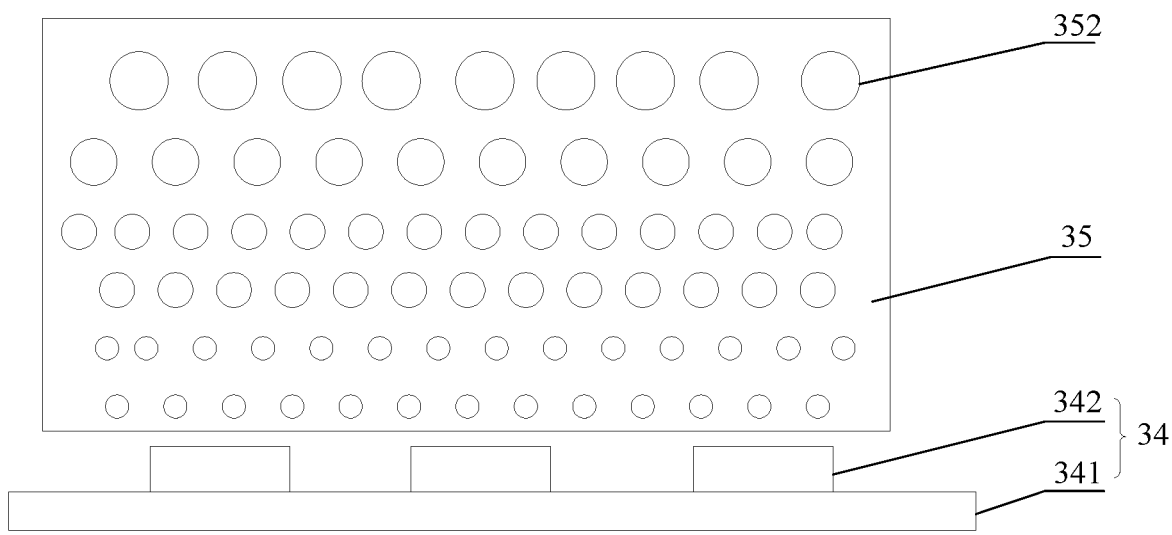
FIG. 8 is a schematic view of dot distribution on the surface of a light leakage preventing member according to an embodiment of the present disclosure.

Further, referring to FIG. 8, the upper surface of the light leakage preventing member 35 may be provided with dots 352. In some embodiments, as shown in FIG. 8, the closer to the light emitting element 342, the smaller the dots 352 may be, and the further from the light emitting element 342, the larger the dots 352 may be. In other embodiments, since the size of the light leakage preventing member 35 is small, the area of the upper surface of the light leakage preventing member 35 is also small, and the sizes of the dots 352 on the upper surface of the upper light leakage preventing member 35 may be the same. Of course, in practical application, the size and distribution rule of the dots 352 may not be limited to the embodiment provided by the embodiment of the present disclosure. Similarly, the lower surface of the light leakage preventing member 35 may be provided with dots 352, and the distribution rule of the dots 352 is similar to that of the dots 352 on the upper surface of the light leakage preventing member 35. In this way, specular reflection of the light at the upper and lower surfaces of the light leakage preventing member 35 can be destroyed, so that the light forms diffuse reflection on the upper and lower surfaces, and is matched with the dots on the bottom surface of the light guide plate 33, so that the light after diffuse reflection by the dots is emitted from the upper surface (light exit surface) of the light guide plate to form a surface light source.

Optionally, please continue to refer to FIG. 3A. The light incident surface of the light guide plate 33 may be an oblique surface. The distance between the light incident surface and the light leakage preventing member 35 gradually increases in the direction from the upper surface of the light guide plate 33 to the bottom surface of the light guide plate 33. The horizontal portion of the back plate 32 is used to support the light guide plate 33. It can also be said that the distance between the light incident surface and the light leakage preventing member 35 gradually increases from the side close to the light exit surface to the side away from the light exit surface. Referring to FIG. 4, if the light incident surface of the light guide plate 33 is arranged in parallel with the bottom surface of the light leakage preventing member 35 (i.e., the surface facing the light incident surface), then the light ray 43 may propagate in the original propagation direction, be refracted to the lower surface of the light guide plate 33, and be reflected by the lower surface to reach the light exit surface.

However, in an exemplary embodiment, the light incident surface of the light guide plate 33 is an oblique surface as shown in FIG. 4, that is, the parallel relationship between the light incident surface of the light guide plate 33 and the bottom surface of the light leakage preventing member 35 is changed, so that the light ray 43 can be refracted toward the light exit surface, the chance of light being reflected by the bottom surface of the light guide plate 33 is reduced, the optical path distance of the light ray 43 before reaching the light exit surface is reduced, and the light efficiency is improved. Therefore, in the embodiment of the present disclosure, the distance between the light incident surface of the light guide plate 33 and the light leakage preventing member 35 gradually increases in the direction from the upper surface of the light guide plate 33 to the bottom surface of the light guide plate 33, so that the light received by the light incident surface can be refracted toward the light exit surface, the optical path distance of the light before reaching the light exit surface can be reduced, and the light efficiency can be improved.

Figure 9:
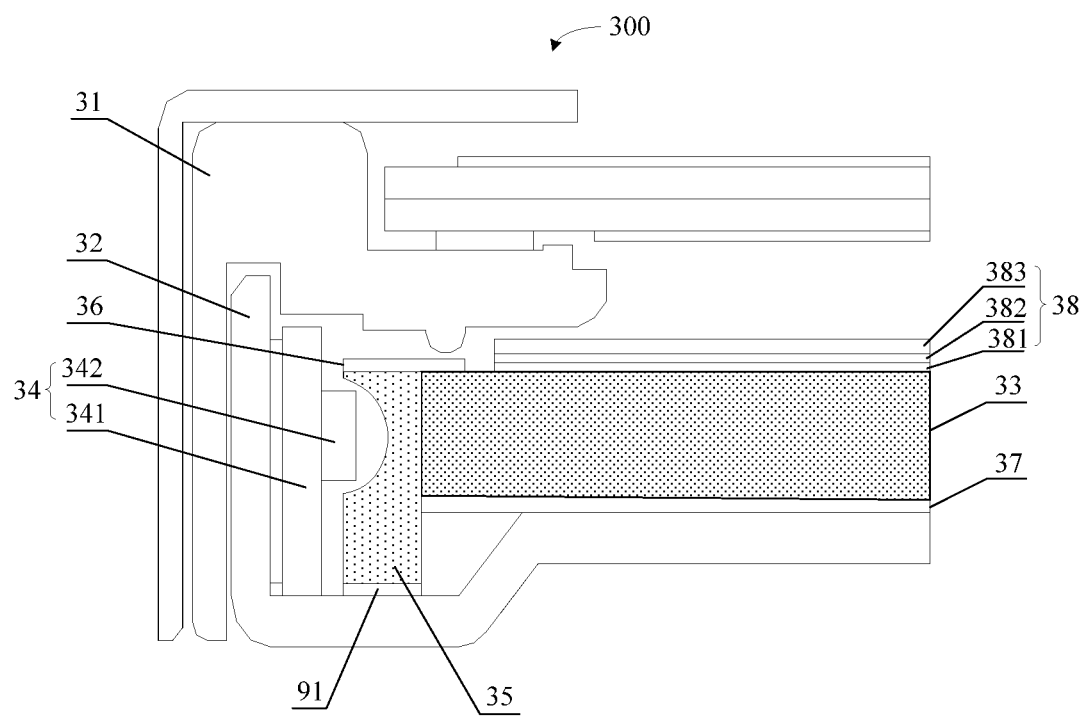
FIG. 9 is a schematic structural view of a side-incidence backlight module according to an embodiment of the present disclosure.

Optionally, please refer to FIG. 9. in order to avoid the modification of the back plate (refer to FIG. 1) in the related art and save the mold design and manufacturing costs, the exemplary embodiment shown in FIG. 9 can also be adopted. In the exemplary embodiment shown in FIG. 9, the thickness of the light leakage preventing member 35 is larger than that of the light guide plate 33, and the thickness of the light leakage preventing member 35 is determined by the distance between the light exit surface of the light guide plate 33 and the surface of the back plate 32 for supporting the light leakage preventing member 35.

Further, in the exemplary embodiment shown in FIG. 9, the side-incidence backlight module 300 includes reflective films 36, 37, and 91. Wherein, the reflective film 36 is attached to the upper surface of the light leakage preventing member 35 and a portion of the upper surface of the light guide plate 33 at the light leakage preventing member 35 side, the reflective film 37 is attached to the lower surface of the light guide plate 33, and the reflective film 91 is attached to the lower surface of the light leakage preventing member 35. The reflective films 36, 37, and 91 can reflect the light exited from the upper and lower surfaces of the light guide plate 33 and the light leakage preventing member 35 back into the light guide plate 33 and the light leakage preventing member 35 to improve the light efficiency.

Alternatively, please continue to refer to FIG. 9. At one side of the light strip 34, the sides of the reflective films 36, 91 are flush with the side of the light leakage preventing member 35, and the side of the reflective film 37 is flush with the side of the light guide plate 33. In this way, the reflective films 36, 37, and 91 can be conveniently attached to ensure the attaching accuracy.

Optionally, a gap may exist between the light leakage preventing member 35 and the light incident surface of the light guide plate 33. In this way, light can be mixed in the gap to solve the hot spot problem. In order to save space, the light incident surface of the light guide plate 33 can adopt an oblique surface as shown in FIG. 3A. Thus, even if the junction between the light exit surface and the light incident surface of the light guide plate 33 contacts the light leakage preventing member 35, due to the existence of the oblique surface, a wedge-shaped gap can still exist between the light leakage preventing member 35 and the light incident surface of the light guide plate 33 for achieving the light mixing effect and solving the hot spot problem. In this way, not only can space be saved, but also the defects of hot spot can be solved, and the light efficiency can be improved.

An exemplary embodiment of the present disclosure also provides a display device including the side-incidence backlight module of any of the above embodiments.

The display device according to some exemplary embodiments has the technical effect that the light leakage preventing member including at least one groove is arranged between the light strip and the light guide plate, and at least part of the light emitting element is accommodated in the groove, so that the light leakage preventing member can increase the proportion of light emitted by the light emitting element entering the light guide plate by changing the propagation direction of light, thereby reducing light leakage, improving light efficiency, and further improving the display effect of the display device.

It should be noted that the display device according to some exemplary embodiments of the present disclosure may be any product or component with display function such as electronic paper, mobile phone, tablet computer, television, notebook computer, digital photo frame, navigator, etc.

It should be noted that in the drawings, the dimensions of layers and regions may be exaggerated for clarity of illustration. Also, it will be understood that when an element or layer is referred to as being "on" another element or layer, it may be directly on the other element or intervening layers may be present. In addition, it will be understood that when an element or layer is referred to as being "under" another element or layer, it may be directly under the other element or there may be more than one intermediate layer or element. In addition, it is also understood that when a layer or element is referred to as being "between" two layers or two elements, it may be the only layer between two layers or two elements, or there may be more than one intermediate layer or element. Like reference numerals refer to like elements throughout.

In this disclosure, the terms "first" and "second" are used for descriptive purposes only and cannot be understood as indicating or implying relative importance. The term "plurality" refers to two or more unless explicitly defined otherwise.

Other embodiments of the present disclosure will readily occur to those skilled in the art upon consideration of the specification and practice of the exemplary embodiments disclosed herein. The present disclosure is intended to cover any variation, use or adaptation of the present disclosure, which follows the general principles of the present disclosure and includes common knowledge or conventional technical means in the technical field not disclosed in the present disclosure. The specification and examples are to be considered as exemplary only, with the true scope and spirit of the disclosure being indicated by the following claims.

It should be understood that the present disclosure is not limited to the precise structure already described above and shown in the drawings, and various modifications and changes may be made without departing from the scope thereof. The scope of the present disclosure is limited only by the appended claims.

The invention claimed is:

1. A side-incidence backlight module comprising:
   a light guide plate;
   a back plate;
   a light strip arranged at a side of a light incident surface of the light guide plate and comprising at least one light emitting element; and
   a light leakage preventing member located between the light strip and the light guide plate and extending along a width direction of the light guide plate, wherein the light leakage preventing member comprises at least one groove, an opening of the at least one groove faces the light strip, and the at least one light emitting element is at least partially accommodated in the groove,
   wherein the light guide plate and the light leakage preventing member are disposed on the back plate, the light incident surface of the light guide plate is an oblique surface, and a distance between the light incident surface and the light leakage preventing member gradually increases in a direction from a light exit surface of the light guide plate to a bottom surface of the light guide plate, and
   wherein the light guide plate is configured such that the light incident surface of the light guide plate is bonded by and oblique to the light exit surface of the light guide plate.

2. The side-incidence backlight module according to claim 1, wherein the light leakage preventing member comprises one groove, the groove runs through the light leakage preventing member along a width direction of the light guide plate.

3. The side-incidence backlight module according to claim 2, wherein a gap exists between the light leakage preventing member and the light incident surface of the light guide plate.

4. A display device comprising the side-incidence backlight module according to claim 2.

5. The side-incidence backlight module according to claim 1, wherein there are a plurality of light emitting elements, a number of grooves is the same as a number of the light emitting elements, and the light emitting elements correspond to the grooves one by one.

6. The side-incidence backlight module according to claim 5, wherein a gap exists between the light leakage preventing member and the light incident surface of the light guide plate.

7. A display device comprising the side-incidence backlight module according to claim 5.

8. The side-incidence backlight module according to claim 1, wherein an upper surface and/or a lower surface of the light leakage preventing member are provided with dots.

9. The side-incidence backlight module according to claim 1, wherein a thickness of the light leakage preventing member is the same as that of the light guide plate, an upper surface of the light leakage preventing member is flush with an upper surface of the light guide plate, and a lower surface of the light leakage preventing member is flush with a lower surface of the light guide plate;
   a length of the light leakage preventing member is the same as a width of the light guide plate.

10. The side-incidence backlight module according to claim 1, further comprising two reflective films, one of which is attached to an upper surface of the light leakage preventing member and part of an upper surface of the light guide plate at the light leakage preventing member side, and the other of which is attached to a lower surface of the light leakage preventing member and a lower surface of the light guide plate.

11. The side-incidence backlight module according to claim 10, wherein at one side of the light strip, sides of the two reflective films are flush with a side of the light leakage preventing member.

12. The side-incidence backlight module according to claim 1, further comprising three reflective films, wherein one reflective film is attached to an upper surface of the light leakage preventing member and part of an upper surface of the light guide plate at the light leakage preventing member side, one reflective film is attached to a lower surface of the light leakage preventing member, and the other reflective film is attached to a lower surface of the light guide plate.

13. The side-incidence backlight module according to claim 1, wherein a material of the light leakage preventing member is the same as that of the light guide plate.

14. The side-incidence backlight module according to claim 1, wherein an inner surface of the groove is a smooth curved surface.

15. The side-incidence backlight module according to claim 14, wherein the curved surface is part of a circumferential surface or part of an elliptical surface.

16. The side-incidence backlight module according to claim 1, wherein the light strip further comprises a printed circuit board, and the at least one light emitting element is disposed on the printed circuit board.

17. The side-incidence backlight module according to claim 1, wherein a gap exists between the light leakage preventing member and the light incident surface of the light guide plate.

18. A display device comprising the side-incidence backlight module according to claim 1.

* * * * *